United States Patent Office 3,357,900
Patented Dec. 12, 1967

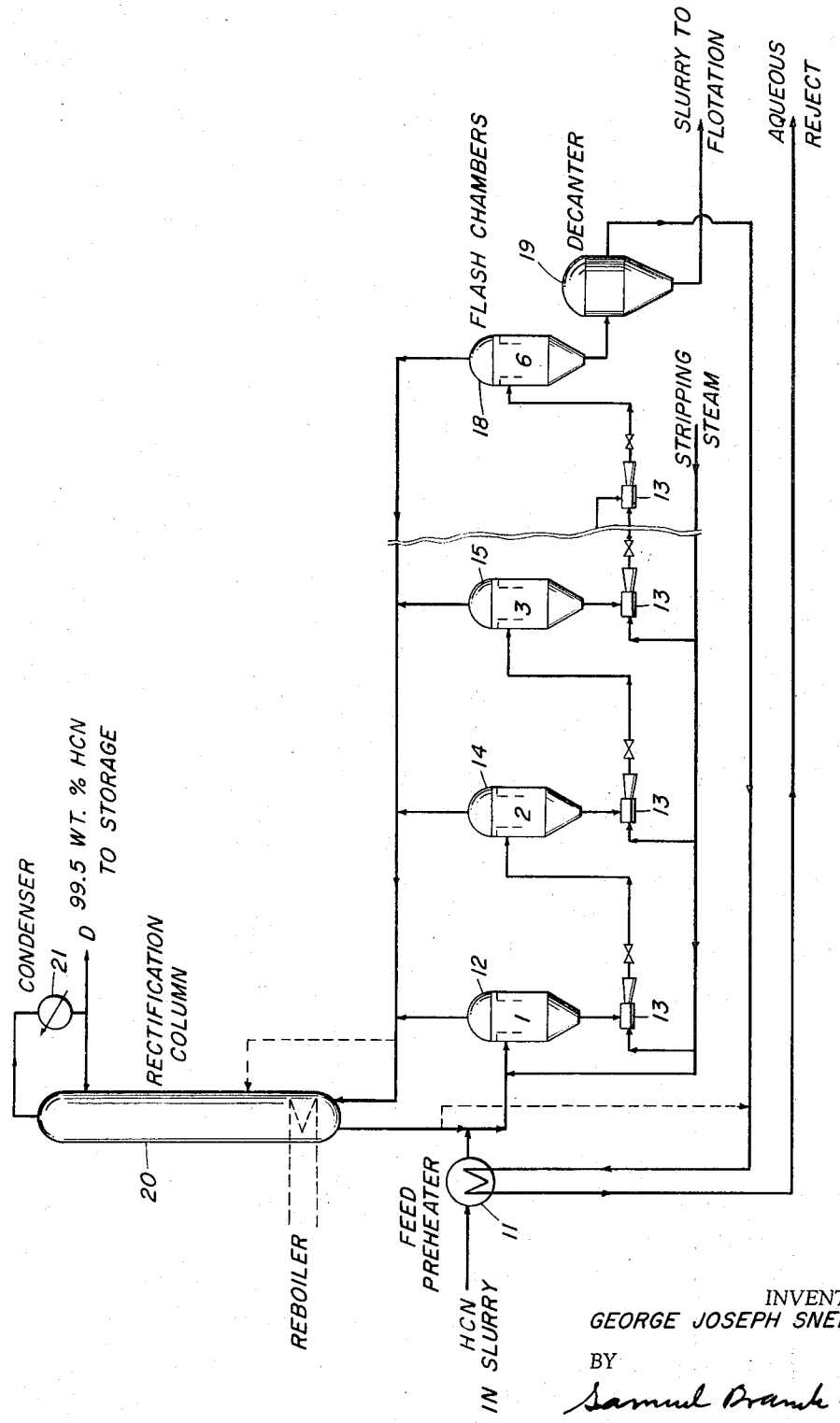

3,357,900
SERIES FLASH DISTILLATION FOR RECOVERY OF HCN FROM AQUEOUS Cu-CONTAINING SLURRIES
George Joseph Snell, Fort Lee, N.J., assignor to American Cyanamid Company, Stamford, Conn., a corporation of Maine
Filed May 17, 1965, Ser. No. 456,380
4 Claims. (Cl. 203—47)

ABSTRACT OF THE DISCLOSURE

Cyanide is recovered and recycled in a continuous process in copper beneficiation by adding steam to a slurry containing copper components, such as cuprosulfide, and flash evaporating the aqueous acidic HCN-containing liquid, reheated with steam, and reflashing, at least once, then (1) separating and recovering solids from the residual liquid phase, and (2) feeding the HCN-containing vapor phase through a rectifying column to recover a rich HCN liquor for reuse. Heat is conserved throughout.

---

This invention relates to the recovery and recycling of cyanide in processes for the beneficiation of ore and ore fractions, particularly processes in which a metal, such as copper, is dissolved from mineral components in an aqueous alkaline cyanide-containing solution and after the metal is precipitated from said solution by addition of a sulfide ion and acidification there remains an acidic cyanide-containing liquid from which the cyanide is to be recovered before or after the copper sulfide is separated from such liquid.

The recovery of copper by leaching with a cyanide solution on the alkaline side followed by separation of the extract, addition of sulfide ion, precipitation of cuprosulfide by acidification, and recovery of the cyanide is described in an application of George William Lower, Ser. No. 418,324, filed Dec. 14, 1964, entitled, "Leaching of Copper From Ores With Cyanide and Recovery of Copper From Cyanide Solutions."

The problem of separating the cuprosulfide and the HCN separately after the precipitation raises complications from an engineering viewpoint. The slurry is acidic and corrosive. It contains HCN, frequently in concentrations of as high as 5% to 10%, and if exposed to the atmosphere while in this condition, toxic gaseous HCN is released. It is difficult to filter such a slurry without the escape of some HCN to the atmosphere, presenting a health hazard. The usual methods of concentrating HCN by rectification are not satisfactory with a slurry because the rectifying column becomes clogged with solids and the slurry leaves solid deposits. As if this were not bad enough, the usual acid is sulfuric, and calcium sulfate in the form of gypsum tends to precipitate slowly from the solution and build up on process equipment.

Simple separation of HCN from aqueous solutions by fractional distillation is shown in such patents as United States Patent 2,267,293, R. N. Washburne and L. U. Spence, "Recovery of Hydrocyanic Acid," Dec. 23, 1941. Such rectification cannot be used with a high solids feed, as the columns become clogged rapidly.

Complex double solution stripping has also been used, as shown in United States Patent 2,368,595, A. J. Johnson, "Process For The Separation of Acidic Gases From Fluids," Jan. 30, 1945.

It has now been found that an economical recovery of both the HCN and the cuprosulfide can be obtained by adding heat; including heat in a heat exchanger from the discarded liquid ore and/or other sources to the slurry, and adding additional heat, conveniently as live steam; and then passing the hot liquid into a flash evaporator across a pressure dropping orifice which permits at least part of the HCN and some water to flash to vapor. The weight percentage of HCN is higher than the mol percentage. The turbulence in the flash evaporator tends to minimize the build-up of solids. The high turbulence also tends to minimize foaming problems. The slurry phase is then reheated by the addition of more live steam with additional HCN being recovered in subsequent stages. Depending upon the cyanide concentration and economic factors, 4 or more stages of such flash evaporation are advantageous. For some plants the optimum number is found to be about 7 or 8 stages. Where the physical layout of a mill permits, as for example, where the mill is on the side of a hill or in a high rise building, the slurry from the bottom of one flash evaporator can be fed to the top of the following flash evaporator by gravity. Otherwise, the heating steam may be used in an injector, or a pump may be used to transfer the slurry. Because of the temperatures involved the addition of steam through an injector is not particularly efficient in pressurizing but enough pressure and heat is introduced to permit subsequent flashing in the following stage. The temperature, pressure and evaporator size for each stage is not necessarily the same.

The vapors containing HCN either separately or together are fed to one or more rectifying columns. As there is a minor quantity of solids, conventional rectifying column techniques may be used to build up a high concentration of HCN at the top of the column. As the HCN is normally recycled in the leaching operation, maximum concentration is not required although a concentrate of at least 99% HCN is readily obtainable. The column bottoms may be heated by a reboiler, when feed is introduced into the central portion of the column and the bottoms discarded. If an enriching or shorter column is used the vapor from the flash evaporation stages is fed to the bottom of the column and the liquid column bottoms may be fed back into and mixed with the feed to an appropriate flash evaporation stage and flashed further. More than one column may be used for large operations.

As the HCN concentration is lower in each successive stage, the vapor from each flash evaporator can be fed to a rectifying column on an appropriate plate, for a bubble cap column, or at an appropriate height for a packed column. Separate heat exchangers may be used to recover heat from the vapor from each evaporator stage, if this is economically justifiable. Usually the vapor is fed as vapor to the rectifying column, with a condenser or heat exchanger providing reflux at the top of the column. A large scale installation is usually required to economically justify the additional mechanical and operational complexity of multistage rectification.

After the series of flash evaporators a stirred tank stripping stage may be optionally used if desired. The slurry from the last flash evaporator stage or stirred tank stage is fed to a decanter which separates the solids from the liquid. The liquid is filtered, if not clear, and then fed back through a heat exchanger to release its heat to the feed, and discarded. Because any gypsum formation would have occurred during the flash evaporator stages, there is little problem with gypsum build-up and the concentrated solids from the decantation step can be filtered. The solids are shipped to a smelter or may be floated to float the suprosulfide from gypsum, with the cuprosulfide going to the smelter and the gypsum being disposed of in the fashion most economically advantageous for a particular installation.

The flash evaporator permits stripping to be accomplished more expeditiously, efficiently and trouble free than other conventional chemical engineering equipment.

One schematic flow sheet of HCN recovery is shown in the accompanying drawing and described in the following Example:

As a representative feed, a slurry is selected containing: about 5% by weight of cyanide as HCN on a solids-free basis and about 11% by weight of solids, including cuprosulfide, minor quantities of gold and silver and other metals. The slurry is from (1) cyanide extraction of a copper ore, on the alkaline side, followed by (2) filtration to separate the liquids and solids, followed by (3) the addition to the filtrate of a soluble sulfide, specifically sodium hydrosulfide, so that the total quantity of sulfide is stoichiometrically equivalent to the amount of copper present, and (4) sulfuric acid to a pH of about 2. The slurry is fed through a heat exchanger 11. The heat exchanger is of phenolic carbon filled plastic which has a comparatively high heat transfer coefficient and very high corrosion resistance. Live steam is added to increase the heat content of the feed sufficiently to give the desired volatilization. The heated filtrate containing HCN and precipitated solids is fed to a first flash chamber 12. A small orifice is used so that the pressure drop causes high velocity, resulting in thorough mixing, and volatilization of part of the HCN. A shield is used to deflect the materials towards the bottom of the flash chamber.

The slurry falls to the bottom of the flash chamber 12. The slurry is then fed from the bottom of the flash chamber 12 through an ejector 13, which adds additional live steam to the slurry, into a second flash chamber 14. The slurry is fed serially through a total of six such flash chambers (four: 12, 14, 15 and 18, are shown in the drawing), being reheated between each pair by the addition of live steam through an injector, which both mixes the steam and pumps the hot mixture to the next flash chamber.

Results from a typical run are shown below:

To stage 1 are fed 150,000 pounds per hour of solids-free liquid, containing 5 weight percent HCN, and additionally 11% solids. This calculates to 7,100 pounds mols/hr. of liquid, in addition to about 16,500 pounds solids. The portion converted to vapor, and the HCN fraction, as mol fractions, from each stage is shown in the following table.

The vapor phase from the flashing chambers, the flow from each stage being as above indicated, is combined and fed to a rectification column 20. The rectification column shown has the feed at the bottom with sufficient column packing to result in a 99.5 weight percent HCN for storage. A condenser 21 at the top provides for reflux.

The product HCN is conveniently used in the process for the leaching of additional copper values from subsequent quantities of the ore. If HCN is used, lime or other alkali is required with most ores to keep the pH within the preferred leaching ranges, which, depending upon the ore, is usually about pH 10 to 12.

It is not necessary that the HCN be concentrated to this great an extent as in some flow sheets it is preferred that a more dilute HCN be recycled to the ore extraction operation to lower the operational costs of the rectifying colume. Usually as the HCN must be stored until ready for reuse, a more concentrated form is preferred to avoid unduly large storage tanks. The column can be operated to provide a concentrated HCN for storage when storage is required and a dilute aqueous HCN solution for recycle to the process when additonal process liquid is desired or permitted. As shown in dotted lines, a reboiler may be used. When the column is fed at a central plate practically pure water is drawn from the bottom of the rectification column for discard or reuse. In the particular flow sheet shown, a shorter column was used without a reboiler, and the bottoms from the column are fed into and mixed with the feed slurry so that the flash chambers themselves act as the first six stages for HCN stripping.

Whereas injectors are shown for circulating, pumps may be used; or the flash chambers may be arranged to permit gravity flow; or the chambers may be kept under different pressures, whereby pressure gradients cause flow.

The process may be operated at near atmospheric pressure. Under such conditions with a flow of 150,000 pounds of aqueous phase in the feed, flash chambers about six feet in diameter and ten feet high give good results. Pressure flash chambers can be used to operate at above atmospheric pressures, or the flashing can occur at subatmospheric pressures. Subatmospheric pressures have the advantage of reducing the temperatures required, permitting the use of waste steam for heat; and also provide a safety

| Stage No. | 1 | 2 | 3 | 4 | 5 | 6 |
|---|---|---|---|---|---|---|
| Vapor Flow Leaving Stage in lb. mol/hr | 200 | 230 | 260 | 290 | 320 | 350 |
| Mol fraction HCN | 0.505 | 0.282 | 0.148 | 0.0731 | 0.0342 | 0.0152 |
| Cumulative Recovery, Percent | 40.2 | 66.6 | 82.5 | 91.3 | 96 | 98.2 |

The slurry is fed serially through the six flash chambers, and from the sixth flash chamber the slurry passes to a decanter 19. The solids are taken from the bottom as a thick slurry, using polyacrylamide or other polyelectrolyte to insure flowability and rapid settling. The solids are fed to a flotation circuit where, using conventional reagents, copper is floated as copper sulfide for further treatment in a smelter. The tails from the flotation cell contain acidic calcium sulfate as gypsum. The gypsum is separated, washed to remove excess acid, and then converted to plaster of Paris by heat, or used for wallboard, or such other profitable disposition made as the geographical location of the mill permits.

The aqueous phase from the decanter is passed through the feed preheater where part of its sensible heat is transferred to the feed, and then the aqueous phase is discarded. The excess acid may be neutralized with lime, where alkaline wastes from other processes are not available, to secure an effluent which is acceptable for disposal under mill conditions. Care must be used so that the acid effluent is not permitted to be combined with alkaline wastes containing cyanides under such conditions as to release toxic quantites of HCN.

factor in that any leaks will introduce air into the system while preventing the escape of toxic HCN.

The equipment is chosen so as to avoid corrosion problems. Because of the corrosive nature of acid HCN, rubber lined or glass lined equipment frequently is the most economical, although corrosion resistant alloys, such as the stainless steels and nickel-containing cast iron, provide satisfactory equipment. Such variations and modifications are, of course, within the skill of those designing such mineral separation plants.

The above description is in connection with a system of particular capacity. It is to be understood that the size of the flash tanks, columns and equipment is controlled by design factors at a particular site to give an ore processing capacity compatible with the price and availability of ore at a particular mine.

Other modifications and variations to fit the present invention to economic and physical site requirements are obvious to those skilled in the art from the above description.

All percentages and proportions are by weight, unless otherwise specified.

The above example is intended to be illustrative only and the invention is defined in the following claims.

1. A process for the recovery of HCN from an acidic aqueous slurry comprising HCN, finely divided cuprous sulfide and calcium sulfate from the acidification of a cyanide leach solution which comprises:
   (a) introducing steam directly into said slurry, thereby heating said slurry;
   (b) passing the resultant heated slurry in series through a plurality of flash evaporating zones;
   (c) flashing the heated slurry in each of said flash evaporating zones, thereby vaporizing part of the HCN, and separating the gaseous phase containing said part of the HCN and water in the overhead, and the liquid slurry containing the solids as bottoms;
   (d) at least once additionally, introducing additional steam into the resultant slurry to reheat said resultant slurry after its passage through a flash evaporating zone, and again flashing the reheated slurry, in a subsequent zone of said series of flash evaporating zones, thereby vaporizing additional HCN, and again separating the gaseous phase containing the additional HCN and water in the overhead, and the liquid slurry containing solids as the bottoms;
   (e) separating said solids from the liquid slurry, and recovering said solids including cuprous sulfide;
   (f) discarding the residual liquid;
   (g) introducing the HCN-containing vapor phases as produced in said flash evaporating zones into a rectifying column;
   (h) supplying indirect heat to the bottom of said column;
   (i) rectifying the HCN and water in said column; and
   (j) condensing and recovering for reuse an HCN rich liquor from the vapor phase zone at the top of the rectifying column.

2. The process of claim 1 in which the said aqueous acidic slurry comprising HCN and solids is heated prior to steam addition by heat exchange with the said residual liquid, thereby conserving process heat.

3. The process of claim 1 in which the column bottoms are discarded.

4. The process of claim 1 in which the column bottoms contain residual HCN and are recycled into the aqueous HCN-containing liquid feed to a flashing chamber.

References Cited
UNITED STATES PATENTS

| | | | |
|---|---|---|---|
| 1,355,384 | 10/1920 | Buchanan | 23—151 |
| 1,742,505 | 1/1930 | Haun | 23—151 |
| 1,782,959 | 11/1930 | Elliott | 202—173 X |
| 1,992,060 | 2/1935 | Evan et al. | 75—106 |
| 2,184,579 | 12/1939 | Brucke | 203—79 |
| 2,543,971 | 3/1951 | Houpt et al. | 203—86 |
| 3,303,021 | 2/1967 | Roberts | 75—105 |

FOREIGN PATENTS
3,793    1931    Australia.

NORMAN YUDKOFF, *Primary Examiner.*

F. E. DRUMMOND, *Assistant Examiner.*